United States Patent
Hagiyama et al.

(10) Patent No.: US 9,160,033 B2
(45) Date of Patent: Oct. 13, 2015

(54) NON-AQUEOUS ELECTROLYTE COMPOSITION AND NON-AQUEOUS ELECTROLYTE SECONDARY BATTERY

(75) Inventors: Kosuke Hagiyama, Yokohama (JP);
Azusa Matsuo, Yokohama (JP);
Hirofumi Yasuda, Yokosuka (JP);
Hiroshi Miyakubo, Yokosuka (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 324 days.

(21) Appl. No.: 13/819,413

(22) PCT Filed: Jul. 15, 2011

(86) PCT No.: PCT/JP2011/066177
§ 371 (c)(1),
(2), (4) Date: Feb. 27, 2013

(87) PCT Pub. No.: WO2012/029418
PCT Pub. Date: Mar. 8, 2012

(65) Prior Publication Data
US 2013/0157124 A1    Jun. 20, 2013

(30) Foreign Application Priority Data
Sep. 3, 2010 (JP) ................. 2010-197839

(51) Int. Cl.
| | |
|---|---|
| H01M 10/40 | (2006.01) |
| H01M 10/26 | (2006.01) |
| H01M 10/056 | (2010.01) |
| H01M 10/052 | (2010.01) |
| H01M 10/0567 | (2010.01) |
| H01M 10/0568 | (2010.01) |

(52) U.S. Cl.
CPC .......... *H01M 10/056* (2013.01); *H01M 10/052* (2013.01); *H01M 10/0567* (2013.01); *H01M 10/0568* (2013.01); *H01M 2220/20* (2013.01); *Y02E 60/122* (2013.01); *Y02T 10/7011* (2013.01)

(58) Field of Classification Search
CPC .......... H01M 10/056; H01M 10/0567; H01M 10/0568; H01M 10/052; H01M 2220/20
USPC ................ 429/338, 314, 325, 200, 306, 322; 524/556
See application file for complete search history.

(56) References Cited

U.S. PATENT DOCUMENTS

| | | | | |
|---|---|---|---|---|
| 7,132,199 | B2 * | 11/2006 | Unoki et al. | 429/338 |
| 2005/0256256 | A1 * | 11/2005 | Muramoto et al. | 524/556 |
| 2008/0003506 | A1 * | 1/2008 | Suzuki et al. | 429/314 |
| 2008/0102377 | A1 | 5/2008 | Abe et al. | |
| 2010/0081062 | A1 | 4/2010 | Chiga et al. | |
| 2010/0178569 | A1 * | 7/2010 | Ihara et al. | 429/325 |

FOREIGN PATENT DOCUMENTS

| | | |
|---|---|---|
| JP | 2007-207723 A | 8/2007 |
| JP | 2009-32491 A | 2/2009 |
| JP | 2009-289414 A | 12/2009 |
| JP | 2010-262800 A | 11/2010 |
| RU | 2 386 195 C1 | 4/2010 |
| WO | WO 2006/070546 A | 7/2006 |
| WO | WO 2007/004813 A1 | 1/2007 |
| WO | WO 2008/007814 A1 | 1/2008 |

OTHER PUBLICATIONS

Russian Decision on Grant and English translation dated Sep. 22, 2014, 14 pgs.

* cited by examiner

*Primary Examiner* — Kenneth Douyette
(74) *Attorney, Agent, or Firm* — Foley & Lardner LLP

(57) ABSTRACT

The present invention provides a non-aqueous electrolyte composition with excellent high-temperature stability and a non-aqueous electrolyte secondary battery using the same. The non-aqueous electrolyte composition includes a supporting electrolyte, an organic solvent, and at least one kind of chemical compound (a) selected from the group consisting of a chemical compound (a1) indicated by the following general formula (1) and a chemical compound (a2) indicated by the following general formula (2).

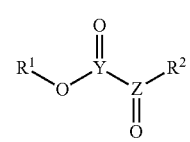

(1)

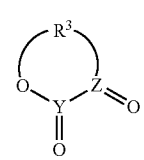

(2)

5 Claims, No Drawings

NON-AQUEOUS ELECTROLYTE COMPOSITION AND NON-AQUEOUS ELECTROLYTE SECONDARY BATTERY

TECHNICAL FIELD

The present invention relates to a non-aqueous electrolyte composition and a non-aqueous electrolyte secondary battery, and more specifically relates to a non-aqueous electrolyte composition with excellent high-temperature stability and a non-aqueous electrolyte secondary battery using the same.

BACKGROUND OF THE INVENTION

In recent years, developments of electric vehicles (EV), hybrid electric vehicles (HEV) and fuel cell vehicles (FCV) have been advanced against the background of escalating environmental protection movement. For a power source for driving the motors used on those vehicles, the rechargeable secondary battery is suitable. In particular, what is attracting the attention of the market is a non-aqueous electrolyte secondary battery such as a lithium-ion secondary battery expected to provide high capacitance and high output.

A non-aqueous electrolyte secondary battery is provided to have a positive electrode activating material layer that is formed on the surface of a charge collector and includes a positive electrode activating material (it is possible to cite $LiCoO_2$, $LiMn_2O_4$, $LiNiO_2$ and the like, for example). Additionally, the non-aqueous electrolyte secondary battery is provided to have a negative electrode activating material layer that is formed on the surface of another charge collector and includes a negative electrode activating material (it is possible to cite metal lithium, carbonaceous materials such as coke, natural or synthetic graphite and the like, metal materials including Sn, Si and the like and oxides of these, for example). Furthermore, the non-aqueous electrolyte secondary battery is provided to have an electrolyte layer containing an electrolyte, the electrolyte layer being disposed between the positive electrode activating material layer and the negative electrode activating material layer to separate the positive electrode activating material layer and the negative electrode activating material layer.

In such a non-aqueous electrolyte secondary battery, a chemical reaction or decomposition of these electrolyte layers may occur at the surface of the positive and/or negative electrode. This has hitherto resulted in a problem such as reduction of the storage characteristics of battery at high temperatures and reduction of the cycle property of secondary battery, and additionally a problem of the generation of gas due to the decomposition product, and so on.

In order to prevent the occurrence of the problems, there has been employed the addition of a compound having a protective film-forming function to an electrolyte solution contained in the electrolyte layer. More specifically, it is known that, when the decomposition of the compound added to the electrolyte solution is deliberately accelerated at the surface of the negative electrode activating material at the time of the initial charging, the decomposition product forms a protective film having a protective function of preventing a further decomposition of the electrolyte layer, i.e., SEI (Solid Electrolyte Interface). Since the protective film is thus formed, a chemical reaction or decomposition of the electrolyte layer is suitably prevented at the surface of the negative electrode and results in achieving the effect of maintaining the battery performance of secondary battery, which has variously been reported.

For example, it is disclosed that a dicarbonyl compound or alternatively a dicarbonyl compound and a vinylene carbonate or the like are contained in a nonaqueous electrolyte solution thereby improving the cycle property and the storage characteristics of battery (see Patent Publication 1).

REFERENCES ABOUT PRIOR ART

Patent Publication

Patent Publication 1: International Publication No. 2006/070546

SUMMARY OF THE INVENTION

In the nonaqueous electrolyte solution discussed in Patent Publication 1, however, the stability is not yet sufficient under high-temperature conditions, which results in a drawback that the performance required for the secondary battery for use in vehicles such as electronic vehicles cannot be satisfied.

The present invention is achieved in view of the above-mentioned conventional techniques, and an object of which is to provide a non-aqueous electrolyte composition with excellent high-temperature stability and a non-aqueous electrolyte secondary battery using the same.

The present inventors eagerly made studies for carrying out the above object, and as a result, found that the object can be achieved by providing such a composition as to contain a compound having halogen as a constituent element and having a specific structure. The present invention was thus accomplished.

More specifically, a non-aqueous electrolyte composition according to the present invention includes a supporting electrolyte, an organic solvent, and at least one kind of chemical compound (a) selected from the group consisting of a chemical compound (a1) indicated by the following general formula (1) and a chemical compound (a2) indicated by the following general formula (2).

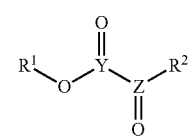

(In the formula (1), O represents oxygen. In the formula (1), Y and Z mutually independently represent one kind of element selected from Group 14 of a larger version of the periodic table, i.e., one kind of element selected from the group consisting of carbon (C), silicon (Si), germanium (Ge) and tin (Sn). In the formula (1), $R^1$ and $R^2$ mutually independently represent at least one kind of group selected from the group consisting of monovalent aliphatic hydrocarbon groups, monovalent alicyclic hydrocarbon groups and monovalent aromatic hydrocarbon groups, and at least either one represents a group having at least one kind of halogen selected from the group consisting of fluorine (F), chlorine (Cl), bromine (Br) and iodine (I) as a constituent element.)

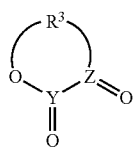

(2)

(In the formula (2), O represents oxygen. In the formula (2), Y and Z mutually independently represent one kind of element selected from Group 14 of a larger version of the periodic table, i.e., one kind of element selected from the group consisting of carbon (C), silicon (Si), germanium (Ge) and tin (Sn). In the formula (2), $R^3$ represents at least one kind of group selected from the group consisting of divalent aliphatic hydrocarbon groups and divalent alicyclic hydrocarbon groups, and represents a group having at least one kind of halogen selected from the group consisting of fluorine (F), chlorine (Cl), bromine (Br) and iodine (I) as a constituent element.)

Moreover, the non-aqueous electrolyte secondary battery according to the present invention uses the non-aqueous electrolyte composition as mentioned above.

According to the present invention, there is provided such a composition as to contain a compound having halogen as a constituent element and having a specific structure, so that it becomes possible to provide a non-aqueous electrolyte composition with excellent high-temperature stability and a non-aqueous electrolyte secondary battery using the same.

THE MODE FOR CARRYING OUT THE INVENTION

Hereinafter, a non-aqueous electrolyte composition relating to one embodiment of the present invention will be discussed in detail.

[Non-Aqueous Electrolyte Composition]

The non-aqueous electrolyte composition according to the present embodiment includes a supporting electrolyte, an organic solvent, and at least one kind of chemical compound (a) selected from the group consisting of a chemical compound (a1) indicated by the following general formula (1) and a chemical compound (a2) indicated by the following general formula (2).

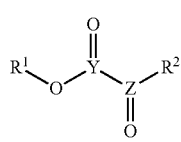

(1)

(In the formula (1), O represents oxygen. In the formula (1), Y and Z mutually independently represent one kind of element selected from Group 14 of a larger version of the periodic table, i.e., one kind of element selected from the group consisting of carbon (C), silicon (Si), germanium (Ge) and tin (Sn). In the formula (1), $R^1$ and $R^2$ mutually independently represent at least one kind of group selected from the group consisting of monovalent aliphatic hydrocarbon groups, monovalent alicyclic hydrocarbon groups and monovalent aromatic hydrocarbon groups, and at least either one represents a group having at least one kind of halogen selected from the group consisting of fluorine (F), chlorine (Cl), bromine (Br) and iodine (I) as a constituent element.)

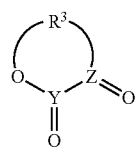

(2)

(In the formula (2), O represents oxygen. In the formula (2), Y and Z mutually independently represent one kind of element selected from Group 14 of a larger version of the periodic table, i.e., one kind of element selected from the group consisting of carbon (C), silicon (Si), germanium (Ge) and tin (Sn). In the formula (2), $R^3$ represents at least one kind of group selected from the group consisting of divalent aliphatic hydrocarbon groups and divalent alicyclic hydrocarbon groups, and represents a group having at least one kind of halogen selected from the group consisting of fluorine (F), chlorine (Cl), bromine (Br) and iodine (I) as a constituent element.)

By containing the compound (a1) or the compound (a2), a great film that includes halogen and excellent in ionic conductivity is formed on the negative electrode at the time of the initial charging, so that it becomes possible to provide a non-aqueous electrolyte composition with which a non-aqueous electrolyte secondary battery exhibiting great cycle property and storage characteristics under high-temperature conditions (for example, at 55° C.) i.e. a non-aqueous electrolyte secondary battery having excellent high-temperature stability can be obtained.

Though the details of this reaction mechanism are not yet pronounced at the present time, it can be assumed that a reductive decomposition is initiated (for example from an oxo group or an oxoacid ester that serves as the starting point) thereby forming an organic film containing lithium on the negative electrode. However, the above-mentioned reaction mechanism is based only on assumption. Therefore, even if the above-mentioned effect is obtained by a mechanism other than the above mechanism, it is within a technical range of the present invention as a matter of course.

Additionally, in the case of not contributing to the film formation thereby to remain in the non-aqueous electrolyte composition, a resistance against oxidation reaction (an oxidation resistance) is strongly exhibited in the vicinity of the positive electrode since the non-aqueous electrolyte composition contains halogen, so that it is expected that the oxidation resistance is improved.

Additionally, the case where the content of the compound (a1) or the compound (a2) is excessively large may result in the increase of the viscosity of the non-aqueous electrolyte composition and in the reduction of the ionic conductivity so as to sometimes degrade the battery performance. Furthermore, in the case where the content of the compound (a1) or the compound (a2) is excessively small, the film is not formed sufficiently and therefore the required battery performance may not be obtained. In view of the above, it is preferable that the total content of the compound (a1) and the compound (a2) is not smaller than 0.01 parts by mass and not larger than 10 parts by mass relative to 100 parts by mass of the total content of the supporting electrolyte and the organic solvent.

Moreover, it is preferable that the non-aqueous electrolyte composition of the present embodiment further contains at least one kind of chemical compound (b) selected from the group consisting of vinylene carbonate, vinyl ethylene carbonate, fluoroethylene carbonate and difluoroethylene carbonate.

By containing these compounds (b), it becomes possible to provide a non-aqueous electrolyte composition with which a non-aqueous electrolyte secondary battery more improved in cycle property and storage characteristics under high-temperature conditions can be obtained.

Additionally, it is preferable that the non-aqueous electrolyte composition of the present embodiment further contains a compound (c) indicated by the following general formula (3).

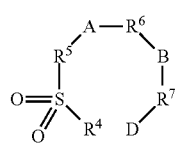

(3)

(In the formula (3), O represents oxygen and S represents sulfur. In the formula (3), A, B and D mutually independently represent at least one kind of group selected from the group consisting of a single bond, oxygen (O), carbonyl group, thiocarbonyl group, sulfinyl group, sulfonyl group and $NR^8$ group ($R^8$ represents at least one kind of group selected from the group consisting of monovalent aliphatic hydrocarbon groups, monovalent alicyclic hydrocarbon groups and monovalent aromatic hydrocarbon groups). In the formula (3), $R^4$, $R^5$, $R^6$ and $R^7$ mutually independently represent a single bond or a divalent aliphatic hydrocarbon group.)

By containing the compound (c), the film formed on the negative electrode becomes dense one so that it is possible to provide a non-aqueous electrolyte composition with which a non-aqueous electrolyte secondary battery more improved in cycle property and storage characteristics under high-temperature conditions can be obtained.

Though the details of this reaction mechanism are not yet pronounced at the present time, it can be assumed that a reductive decomposition is initiated (for example from a sulfonyl group or a sulphonate group that serves as the starting point) thereby forming an organic film containing lithium on the negative electrode. Moreover, concerning a compound having two sulfonyl groups (for example, a cyclic disulfonic acid ester) it is assumed that the reductive decomposition is easily initiated because of the larger number of starting points thereby easily exhibiting the above-mentioned effect as compared with a compound having one sulfonyl group. Therefore, even if the above-mentioned effect is obtained by a mechanism other than the above mechanism, it is within a technical range of the present invention as a matter of course.

Additionally, the case where the content of the compound (c) is excessively large may result in the increase of the viscosity of the non-aqueous electrolyte composition and in the reduction of the ionic conductivity so as to sometimes degrade the battery performance. Furthermore, in the case where the content of the compound (c) is excessively small, the film is not formed sufficiently and therefore the required battery performance may not be obtained. In view of the above, it is preferable that the content of the compound (c) is not smaller than 0.01 parts by mass and not larger than 10 parts by mass relative to 100 parts by mass of the total content of the supporting electrolyte and the organic solvent.

Incidentally, in the case of combining the compound (b) and the compound (c), it is preferable that the ratio between them (Chemical compound (b)/Chemical compound (c)) is 0.02 to 5 in weight ratio. Within the above range, it becomes possible to provide a non-aqueous electrolyte composition with which a non-aqueous electrolyte secondary battery more improved in cycle property and storage characteristics under high-temperature conditions can be obtained.

Each component will be discussed in more detail.

(Supporting Electrolyte)

A supporting electrolyte is required only to be one generally used in lithium-ion secondary batteries, and therefore it is possible to cite lithium hexafluorophosphate ($LiPF_6$), lithium tetrafluoroborate ($LiBF_4$), lithium bis(trifluoromethanesulfonyl)imide ($Li(CF_3SO_2)_2N$), lithium bis(pentafluoroethanesulfonyl)imide ($Li(C_2F_5SO_2)_2N$) and lithium bis(fluorosulfonyl)imide ($Li(FSO_2)_2N$) as preferable examples. However, the supporting electrolyte is not limited to these. For example, it is also possible to apply a lithium salt selected from inorganic acid anion salts and organic acid anion salts, such as lithium perchlorate ($LiClO_4$), lithium hexafluoroarsenate ($LiAsF_6$), lithium hexafluorotantalate ($LiTaF_6$), lithium tetrachloroaluminate ($LiAlCl_4$), lithium decachlorodecaborate ($Li_2B_{10}Cl_{10}$) and the like.

It is possible to use one kind of them singly or use two or more kinds of them in combination.

(Organic Solvent)

As an organic solvent, it is possible to use at least one kind or a mixture of two or more kinds selected from: cyclic carbonates such as propylene carbonate, ethylene carbonate and the like; straight chain carbonates such as dimethyl carbonate, methyl ethyl carbonate, diethyl carbonate and the like; ethers such as tetrahydrofuran, 2-methyltetrahydrofuran, 1,4-dioxane, 1,2-dimethoxyethane, 1,2-dibutoxyethane and the like; lactones such as γ-butyrolactone and the like; nitriles such as acetonitrile; esters such as methyl propionate and the like; amides such as dimethylformamide; methyl acetate and methyl formate.

(Compound (a1))

A compound (a1) is required only to be represented by the above-mentioned general formula (1) and therefore not particularly limited. As either one of $R^1$ and $R^2$ in the general formula (1), it is possible to cite at least one kind of group selected from the group consisting of: monovalent halogenated alkyl group $C_mH_{2m-n+1}X_n$ (X represents at least one kind of halogen element selected from the group consisting of fluorine (F), chlorine (Cl), bromine (Br) and iodine (I). "m" represents an integer of from 1 to 10, preferably from 1 to 5. "n" satisfies 1≤n≤2m+1.); monovalent halogenated alkenyl group $C_mH_{2m-n-1}X_n$ (X represents at least one kind of halogen element selected from the group consisting of fluorine (F), chlorine (CO, bromine (Br) and iodine (I). "m" represents an integer of from 1 to 10, preferably from 1 to 5. "n" satisfies 1≤n≤2m-1.); and monovalent halogenated aryl group $C_mH_{2m-7}$ ("m" represents an integer of from 6 to 10.), for example. Additionally, as the other of $R^1$ and $R^2$ in the general formula (1), it is possible to cite at least one kind of group selected from the group consisting of: monovalent halogenated alkyl group $C_mH_{2m-n+1}X_n$ (X represents at least one kind of halogen element selected from the group consisting of fluorine (F), chlorine (Cl), bromine (Br) and iodine (I). "m" represents an integer of from 1 to 10, preferably from 1 to 5. "n" satisfies 1≤n≤2m+1.); monovalent halogenated alkenyl group $C_mH_{2m-n-1}X_n$ (X represents at least one kind of halogen element selected from the group consisting of fluorine (F), chlorine (Cl), bromine (Br) and iodine (I). "m" represents an integer of from 1 to 10, preferably from 1 to 5. "n" satisfies 1≤n≤2m-1.); and monovalent halogenated aryl group $C_mH_{2m-7}$ ("m" represents an integer of from 6 to 10.), for example. However, examples of the other of $R^1$ and $R^2$ are not limited to these. In other words, it is also possible to cite at least one kind of group selected from the group consisting of monovalent alkyl groups $C_mH_{2m+1}$ ("m" represents an integer of from 1 to 10, preferably from 1 to 5.), monovalent alkenyl groups $C_mH_{2m-1}$ ("m" represents an integer of from 1 to 10, preferably from 1 to 5.) and monovalent aryl groups $C_mH_{2m-7}$ ("m" represents an integer of from 6 to 10.), for example, as the other of $R^1$ and $R^2$ in the general formula (1).

Concrete examples of the compound (a1) can be quoted by halogenated straight chain dioxo acid esters such as methyl 2-oxo-3-bromo-3,3-difluorofluoropropionate, methyl 2-oxo-3,3-difluoropropionate, methyl 3-fluoropyruvate, methyl 2-oxo-3,3,3-trifluoropropionate, ethyl 2-oxo-3,3,3-trifluoropropionate, methyl 2-oxo-3-bromopropionate, ethyl 2-oxo-3-bromopropionate, ethyl 3,5-difluorobenzoylformate and the like.

(Compound (a2))

A compound (a2) is required only to be represented by the above-mentioned general formula (2) and therefore not particularly limited.

As $R^3$ in the general formula (2), it is possible to cite a divalent halogenated alkylene group $C_mH_{2m-n}X_n$ (X represents at least one kind of halogen element selected from the group consisting of fluorine (F), chlorine (Cl), bromine (Br) and iodine (I). "m" represents an integer of from 1 to 5. "n" satisfies $1 \leq n \leq 2m$.), for example.

Representative examples of the compound (a2) can be quoted by halogenated cyclic dioxo acid esters such as dihydro-4-fluoromethyl-4-propylfuran-2,3-dione, dihydro-4-fluoroethyl-4-methylfuran-2,3-dione and the like.

(Compound (c))

A compound (c) is required only to be represented by the above-mentioned general formula (3) and therefore not particularly limited.

As $R^8$ of the $NR^8$ group in the general formula (3), it is possible to cite at least one kind of group selected from the group consisting of monovalent alkyl groups $C_mH_{2m+1}$ ("m" represents an integer of from 1 to 5.), monovalent alkenyl groups $C_mH_{2m-1}$ ("m" represents an integer of from 1 to 5.) and monovalent aryl groups $C_mH_{2m-7}$ ("m" represents an integer of from 6 to 10.).

Furthermore, the at least one kind of group selected from the group consisting of monovalent aliphatic hydrocarbon groups, monovalent alicyclic hydrocarbon groups and monovalent aromatic hydrocarbon groups can be exemplified by at least one kind of group selected from the group consisting of monovalent alkyl groups $C_mH_{2m+1}$ ("m" represents an integer of from 1 to 5.), monovalent alkenyl groups $C_mH_{2m-1}$ ("m" represents an integer of from 1 to 5.) and monovalent aryl groups $C_mH_{2m-7}$ ("m" represents an integer of from 6 to 10.).

Furthermore, $R^4$, $R^5$, $R^6$ and $R^7$ in the general formula (3) can mutually independently be exemplified by a single bond or a divalent alkylene group $C_mH_{2m}$ ("m" represents an integer of from 1 to 5.).

Concrete examples of the compound (c) can be quoted by cyclic sulfonic acid esters such as 1,3-propanesultone, 1,4-butanesultone, 2,4-butanesultone and the like; however, the compound (C) is not limited to these. Therefore, it is also possible to employ a cyclic disulfonic acid ester having two sulfonyl groups.

An embodiment of the non-aqueous electrolyte composition can be exemplified by an electrolyte solution (including a supporting electrolyte and an organic solvent), a polymer gel electrolyte, a laminate of the polymer gel electrolyte and the like.

The polymer gel electrolyte is not particularly limited but it is preferable that the ratio (mass ratio) between a polymer that constitutes the polymer gel electrolyte and the electrolyte solution is 20:80 to 98:2.

The polymer gel electrolyte is provided in such a manner that a solid polyelectrolyte having ionic conductivity contains an electrolyte solution employed in usual lithium ion batteries, and also involves those obtained by retaining the same electrolyte solution in the skeleton of a polymer having no lithium ion conductivity.

As polymer used for the polymer gel electrolyte and has no lithium ion conductivity, it is possible to use polyvinylidene fluoride (PVdF), polyvinyl chloride (PVC), polyacrylonitrile (PAN), polymethyl methacrylate (PMMA) or the like, for example. However, the polymer is not limited to these. Since PAN, PMMA and the like belong rather to a category having little ionic conductivity, there may be used the polymer having ionic conductivity. PAN, PMMA and the like are cited only as examples of the polymer used for the polymer gel electrolyte and having no lithium ion conductivity.

Then, a non-aqueous electrolyte secondary battery relating to one embodiment of the present invention will be discussed in detail.

The non-aqueous electrolyte secondary battery of the present embodiment uses the above-mentioned non-aqueous electrolyte composition relating to one embodiment of the present invention.

As representative examples of the non-aqueous electrolyte secondary battery of the present embodiment, it is possible to cite those using: a positive electrode activating material layer and a negative electrode activating material layer formed on a charge collector; a separator; and the above-mentioned non-aqueous electrolyte composition.

Each of the component other than the above-mentioned non-aqueous electrolyte composition will be discussed in more detail.

(Charge Collector)

A charge collector is required only to function as a charge collector and therefore not particularly limited, so that it is possible to employ a metal foil or a film including a resin layer having conductivity.

As the metal foil, it is possible to cite aluminium foil, copper foil, nickel foil, stainless foil, platinum foil and the like, for example.

As the film including a resin layer having conductivity, it is possible to employ a film formed of a composite conductive plastic obtained by adding a conductive agent containing inorganic materials as the primary component to a resin that serves as a binder, for example.

More specifically, the film is formed in such a manner that a metal paste for forming a charge collector is heated and shaped, the paste containing a metal powder of aluminium, copper, titanium, nickel, stainless steel (SUS), an alloy of these or the like, a carbon powder of graphite, hard carbon or the like or the like as the primary component. Alternatively, the film is formed of a metal powder or a carbon powder and a binder. These metal powders and carbon powders may be used singly (one kind) or in combination of two or more kinds. Moreover, the binder should not particularly be limited. Though it is possible to use a conventionally known binder material such as polyethylene, epoxy resin or the like, the binder is not limited to these. In other words, it is also possible to employ a conductive polymer material such as polyacetylen, polypyrrole, polythiophene, polyaniline and the like.

Additionally, in the case where the charge collector is one that forms a film by a thin-film fabrication technique such as spray coating and the like, it is also possible to put the characteristics of the fabrication method to full use, i.e., it is possible to laminate different kinds of metal powders.

Incidentally, as the charge collector including a resin layer having conductivity, it is also possible to use those formed of a conductive polymer material such as polyacetylen, polypyrrole, polythiophene, polyaniline and the like.

(Positive Electrode Activating Material Layer)

A material that constitutes a positive electrode activating material layer can be exemplified by positive electrode activating materials, and as necessary, conductive agents, binding agents and the like.

As the positive electrode activating material, there is preferably used a composite oxide of a transition metal serving as a component of a general lithium ion battery and lithium (a lithium-transition metal composite oxide).

Concrete examples of usable positive electrode activating material are: Li—Mn composite oxides such as $LiMnO_2$, $LiMn_2O_4$ and the like; Li—Co composite oxides such as $LiCoO_2$ and the like; Li—Cr composite oxides such as $Li_2Cr_2O_7$, $Li_2CrO_4$ and the like; Li—Ni composite oxides such as $LiNiO_2$ and the like; Li—Fe composite oxides such as $Li_xFeO_y$, $LiFeO_2$ and the like; Li—V composite oxides such as $Li_xV_yO_z$ and the like; compounds obtained by substituting a part of these transition metals with other element (for example, LiNixCo1–xO2 (0<x<1) etc.); and the like. Thus the positive electrode activating material can be selected from Li metal oxides, but in the present invention it does not limited to these materials. The lithium-transition metal composite oxide is excellent in reactivity and cycle durability and serves as a low-cost material; therefore, the use of these materials for electrodes is advantageous in that it becomes possible to form a secondary battery excellent in output characteristics. In addition, it is also possible to cite phosphoric acid compounds of a transition metal and lithium, such as $LiFePO_4$ and the like, oxides, sulfides ($V_2O_5$, $MnO_2$, $TiS_2$ and $MoS_2$), transition metal oxides such as $MoO_3$, $PbO_2$, $AgO$, $NiOOH$ and the like.

In particular, when a Li—Mn composite oxide is used as the positive electrode activating material, it becomes possible to reduce the gradient of a voltage-SOC profile. With this, the state of charge of battery (SOC) can be grasped by measuring the voltage, so that the reliability of battery can be enhanced.

(Negative Electrode Activating Material Layer)

A material that constitutes a negative electrode activating material layer can be exemplified by negative electrode activating materials, and as necessary, conductive agents, binding agents and the like.

The negative electrode activating material is quoted by crystalline carbon materials and non-crystalline carbon materials, and correctly quoted by natural graphite, synthetic graphite, carbon black, activated carbon, carbon fiber, coke, soft carbon, hard carbon and the like. In some cases, two or more kinds of the above-mentioned negative electrode activating materials may be used in combination. When the crystalline carbon material or the non-crystalline carbon material is used as the negative electrode activating material, it becomes possible to reduce the gradient of the voltage-SOC profile. With this, the state of charge of battery (SOC) can be grasped by measuring the voltage, so that the reliability of battery can be enhanced. This effect is particularly conspicuous in the cases of non-crystalline carbon.

(Separator)

A separator is mostly formed of a material provided to have a lot of pores, such as a porous resin and a nonwoven fabric intertwined with resinous fibers.

EXAMPLES

Hereinafter, the present invention will be discussed in more details with reference to Examples and Comparative Examples; however, the present invention is not limited to these Examples.

Example 1

<Preparation of Non-Aqueous Electrolyte Composition>

As an organic solvent, there was prepared a mixture of ethylene carbonate (EC), ethyl methyl carbonate (EMC) and diethyl carbonate (DEC) obtained at a ratio (a volume ratio) of EC:EMC:DEC=30:30:40. Then, lithium hexafluorophosphate ($LiPF_6$) serving as a supporting electrolyte was added thereto to have a concentration of 1 mol/L (=1M) relative to the organic solvent. Furthermore, 0.5 parts by mass of methyl 3-fluoropyruvate serving as a compound (a1) was added relative to 100 parts by mass of the total content of the supporting electrolyte and the organic solvent, thereby obtaining a non-aqueous electrolyte composition of the present example.

<Production of Positive Electrode>

A solid content including: 85 parts by mass of $LiMn_2O_4$ (average particle size: 15 µm) serving as a positive electrode activating material; 5 parts by mass of acetylene black serving as a conductive agent; and 10 parts by mass of polyvinylidene fluoride (PVdF) serving as a binding agent was prepared. To the solid content, a proper amount of N-methyl-2-pyrrolidone (NMP) serving as a viscosity-modifying solvent was added, thereby preparing a positive electrode slurry. Thereafter, the positive electrode slurry was applied to one side of an aluminium foil (thickness: 20 µm) serving as a charge collector and then dried, thereby obtaining a positive electrode for the present example.

<Production of Negative Electrode>

A solid content including: 85 parts by mass of mesocarbon microbeads (MCMB) (average particle size: 20 m) serving as a negative electrode activating material; 5 parts by mass of acetylene black serving as a conductive agent; and 10 parts by mass of PVdF serving as a binding agent was prepared. To the solid content, a proper amount of NMP serving as a viscosity-modifying solvent was added, thereby preparing a negative electrode slurry. Thereafter, the negative electrode slurry was applied to one side of a copper foil (thickness: 15 µm) serving as a charge collector and then dried, thereby obtaining a negative electrode for the present example.

<Production of Electric Cell>

Each of the positive electrode and the negative electrode was run through a heating rolling press to be subjected to heating press to the extent that the electrode did not break through the film. At this time, the positive electrode activating material layer and the negative electrode activating material layer respectively had a thickness of 75 µm and 65 µm.

Then, these were cut to a shape of a 90 mm square, and the positive electrode and the negative electrode were adhered to each other through a 95 mm square separator (a polyolefin microporous film having a thickness of 20 µm).

Thereafter, each of the positive electrode and the negative electrode was provided with a tab by welding and then sealed in a case formed of an aluminium laminate, together with the non-aqueous electrolyte composition of the present example, thereby obtaining an electric cell (a non-aqueous electrolyte secondary battery) of the present example.

<Evaluation of Battery>

The thus obtained non-aqueous electrolyte secondary battery was evaluated according to a charge/discharge characteristics test. This charge/discharge characteristics test was conducted upon heating the battery to a temperature of 55° C. in a constant temperature bath kept at 55° C. Charging was achieved in such a manner as to start constant-current charging (CC) to reach 4.2 V at a rate of current of 1 C and then switch to constant-voltage charging (CV), for 3 hours in total. Then, an interval of 10 minutes was provided. Thereafter, discharging was carried out to reach 2.5 V at a rate of current of 1 C, followed by providing a 10 minutes of interval. The above procedure was defined as one cycle, in which the charge/discharge characteristics test was performed. The ratio discharged after 100 cycles, relative to the initial discharge capacity was defined as a capacity retention ratio.

Concerning Example 1, a part of the specifications and the obtained result of the capacity retention ratio were shown in Table 1. Incidentally, the structural formulas of methyl 3-fluoropyruvate, methyl 2-oxo-3,3-difluoropropionate, methyl 2-oxo-3-bromopropionate and methyl pyruvate in Table 1 are respectively represented by the chemical formulas (4) to (7).

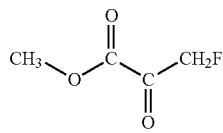

(4)

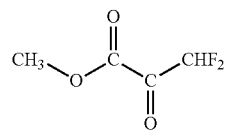

(5)

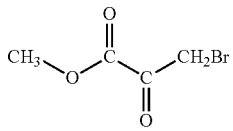

(6)

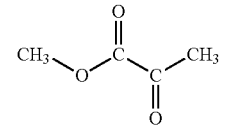

(7)

Example 2 to Example 14 and Comparative Example 1 to Comparative Example 6

The procedure of Example 1 was repeated with the exception that the specifications were modified as shown in Table 1, thereby obtaining a non-aqueous electrolyte composition and a non-aqueous electrolyte secondary battery of each example. The procedure of Example 1 was repeated thereby evaluating the battery of each of the examples.

The result of the capacity retention ratio, obtained in each of the examples was shown in Table 1.

TABLE 1

| | | | Non-aqueous Electrolyte Composition | | | | | | |
|---|---|---|---|---|---|---|---|---|---|
| | Supportiong Salt | Organic Solvent (volume ratio) | Compound (a) | (parts by mass) | Compound (b) | (parts by mass) | Compound (c) | (parts by mass) | Capacity Retention Ratio (%) |
| Example 1 | 1M LiPF6 | EC/EMC/DEC (30/30/40) | Methyl 3-Fluoropyruvate | 0.5 | — | — | — | — | 73.1 |
| Example 2 | 1M LiPF6 | EC/EMC/DEC (30/30/40) | Methyl 3-Fluoropyruvate | 0.5 | Vinylene Carbonate | 2 | — | — | 79.1 |
| Example 3 | 1M LiPF6 | EC/EMC/DEC (30/30/40) | Methyl 3-Fluoropyruvate | 0.5 | — | — | 1,3-Propanesultone | 1 | 83.4 |
| Example 4 | 1M LiPF6 | EC/EMC/DEC (30/30/40) | Methyl 3-Fluoropyruvate | 1 | Fluoroethylene Carbonate | 2 | — | — | 83.9 |
| Example 5 | 1M LiPF6 | EC/EMC/DEC (30/30/40) | Methyl 3-Fluoropyruvate | 1 | — | — | — | — | 75.8 |
| Example 6 | 1M LiPF6 | EC/EMC/DEC (30/30/40) | Methyl 3-Fluoropyruvate | 1 | Vinylene Carbonate | 2 | — | — | 84.3 |
| Example 7 | 1M LiPF6 | EC/EMC/DEC (30/30/40) | Methyl 3-Fluoropyruvate | 1 | — | — | 1,3 Propanesultone | 1 | 87.1 |
| Example 8 | 1M LiPF6 | EC/EMC/DEC (30/30/40) | Methyl 3-Fluoropyruvate | 1 | Fluoroethylene Carbonate | 2 | — | — | 89.5 |
| Example 9 | 1M LiPF6 | EC/EMC/DEC (30/30/40) | Methyl 2-Oxo-3,3-difluoropropionate | 1 | — | — | — | — | 71.4 |
| Example 10 | 1M LiPF6 | EC/EMC/DEC (30/30/40) | Methyl 2-Oxo-3,3-difluoropropionate | 1 | Vinylene Carbonate | 2 | — | — | 80.5 |
| Example 11 | 1M LiPF6 | EC/EMC/DEC (30/30/40) | Methyl 2-Oxo-3,3-difluoropropionate | 1 | — | — | 1,3-Propanesultone | 1 | 82.8 |
| Example 12 | 1M LiPF6 | EC/EMC/DEC (30/30/40) | Methyl 2-Oxo-3-bromopropionate | 1 | — | — | — | — | 67.9 |
| Example 13 | 1M LiPF6 | EC/EMC/DEC (30/30/40) | Methyl 2-Oxo-3-bromopropionate | 1 | Vinylene Carbonate | 2 | — | — | 77.9 |
| Example 14 | 1M LiPF6 | EC/EMC/DEC (30/30/40) | Methyl 2-Oxo-3-bromopropionate | 1 | — | — | 1,3-Propanesultone | 1 | 79.4 |
| Comparative Example 1 | 1M LiPF6 | EC/EMC/DEC (30/30/40) | — | — | — | — | — | — | 65.2 |
| Comparative Example 2 | 1M LiPF6 | EC/EMC/DEC (30/30/40) | — | — | Vinylene Carbonate | 2 | — | — | 74.1 |
| Comparative Example 3 | 1M LiPF6 | EC/EMC/DEC (30/30/40) | — | — | — | — | 1,3-Propanesultone | 1 | 71.6 |

TABLE 1-continued

Non-aqueous Electrolyte Composition

|  | Supporting Salt | Organic Solvent (volume ratio) | Compound (a) | (parts by mass) | Compound (b) | (parts by mass) | Compound (c) | (parts by mass) | Capacity Retention Ratio (%) |
|---|---|---|---|---|---|---|---|---|---|
| Comparative Example 4 | 1M LiPF6 | EC/EMC/DEC (30/30/40) | — | — | Fluoroethylene Carbonate | 1 | — | — | 70.4 |
| Comparative Example 5 | 1M LiPF6 | EC/EMC/DEC (30/30/40) | Methyl pyruvate | 1 | — | — | — | — | 66.8 |
| Comparative Example 6 | 1M LiPF6 | EC/EMC/DEC (30/30/40) | Methyl pyruvate | 0.5 | — | — | — | — | 65.5 |

From Table 1, Examples 1 to 14 included in the range of the present invention are found to be superior in capacity retention ratio under high-temperature conditions to respectively corresponding Comparative Examples 1 to 6, and therefore found to be a non-aqueous electrolyte composition from which a non-aqueous electrolyte secondary battery excellent in cycle property and storage characteristics under high-temperature conditions can be obtained.

For example, if comparisons are made among Example 1, Example 5 and Comparative Example 5 or comparisons are made among Example 9, Example 12 and Comparative Example 6, it becomes evident that the non-aqueous composition is provided as one from which a non-aqueous electrolyte secondary battery excellent in cycle property and storage characteristics under high-temperature conditions can be obtained, by virtue of containing halogen.

Additionally, if comparisons are made among Examples 2 to 4, Examples 6 to 8, Example 10, Example 11, Example 13, Example 14 and Comparative Examples 2 to 4, it becomes evident that the non-aqueous composition is provided as one from which a non-aqueous electrolyte secondary battery excellent in cycle property and storage characteristics under high-temperature conditions can be obtained since the combination of the compound (a), the compound (b) and the compound (c) contains halogen and contributes to the film formation.

Although the present invention has been described above by reference to certain embodiments, the invention is not limited to the embodiments. Modifications and variations of the embodiments are allowed within a range of the gist of the invention.

The invention claimed is:

1. A non-aqueous electrolyte composition comprising:
a supporting electrolyte;
an organic solvent; and
at least one kind of chemical compound (a) selected from the group consisting of a chemical compound (a1) indicated by the following general formula (1) and a chemical compound (a2) indicated by the following general formula (2)

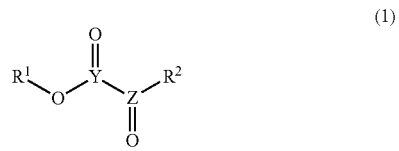

(1)

in the formula (1), O represents oxygen; in the formula (1), Y and Z mutually independently represent an element selected from the group consisting of carbon (C), silicon (Si), germanium (Ge) and tin (Sn); in the formula (1), $R^1$ and $R^2$ mutually independently represent at least one kind of group selected from the group consisting of monovalent aliphatic hydrocarbon groups, monovalent alicyclic hydrocarbon groups and monovalent aromatic hydrocarbon groups, and at least either one represents a group having at least one kind of halogen selected from the group consisting of fluorine (F), chlorine (Cl), bromine (Br) and iodine (I) as a constituent element.

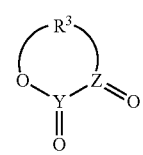

(2)

(In the formula (2), O represents oxygen; In the formula (2), Y and Z mutually independently represent one kind of element selected from Group 14 of a larger version of the periodic table, i.e., one kind of element selected from the group consisting of carbon (C), silicon (Si), germanium (Ge) and tin (Sn); In the formula (2), $R^3$ represents at least one kind of group selected from the group consisting of divalent aliphatic hydrocarbon groups and divalent alicyclic hydrocarbon groups, and represents a group having at least one kind of halogen selected from the group consisting of fluorine (F), chlorine (Cl), bromine (Br) and iodine (I) as a constituent element).

2. A non-aqueous electrolyte composition as claimed in claim 1, further comprising:
at least one kind of chemical compound (b) selected from the group consisting of vinylene carbonate, vinyl ethylene carbonate, fluoroethylene carbonate and difluoroethylene carbonate.

3. A non-aqueous electrolyte composition as claimed in claim 1, further comprising:
a compound (c) indicated by the following general formula (3)

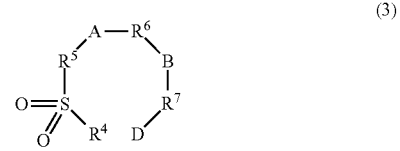

(3)

in the formula (3), O represents oxygen and S represents sulfur; in the formula (3), A, B and D mutually independently represent at least one kind of group selected from the group consisting of a single bond, oxygen (O), carbonyl group, thiocarbonyl group, sulfinyl group, sulfonyl group and $NR^8$ group ($R^8$ represents at least one kind of group selected from the group consisting of monovalent aliphatic hydrocarbon groups, monovalent alicyclic hydrocarbon groups and monovalent aromatic hydrocarbon groups); in the formula (3), R4, R5, R6 and R7 mutually independently represent a single bond or a divalent aliphatic hydrocarbon group.

4. A non-aqueous electrolyte composition as claimed in claim 1, wherein the supporting electrolyte contains at least one kind of lithium salt selected from the group consisting of lithium hexafluorophosphate, lithium tetrafluoroborate, lithium bis(trifluoromethanesulfonyl)imide, lithium bis(pentafluoroethanesulfonyl)imide and lithium bis(fluorosulfonyl)imide.

5. A non-aqueous electrolyte secondary battery that uses the non-aqueous electrolyte composition as claimed in claim 1.

* * * * *